Aug. 11, 1964 G. V. MACK 3,144,079
SHELF STRUCTURE INCLUDING A CONDUIT
Filed March 23, 1960 3 Sheets-Sheet 1
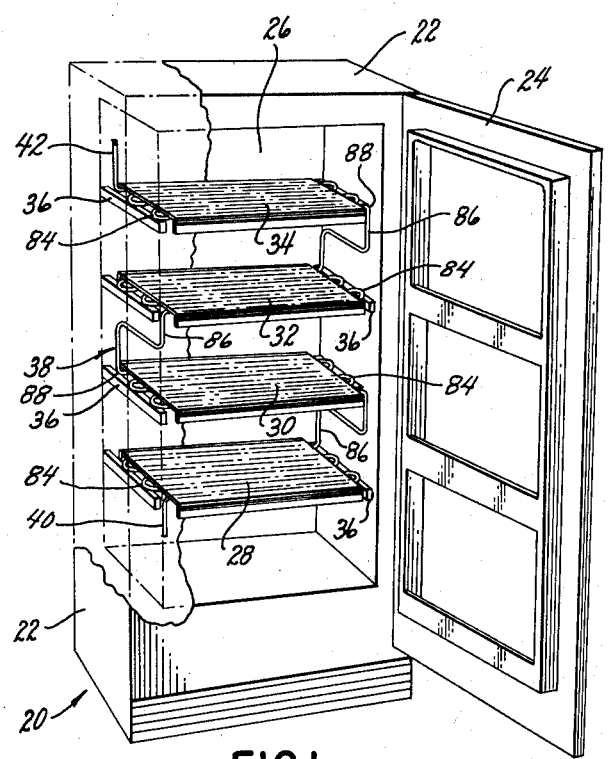
FIG.1
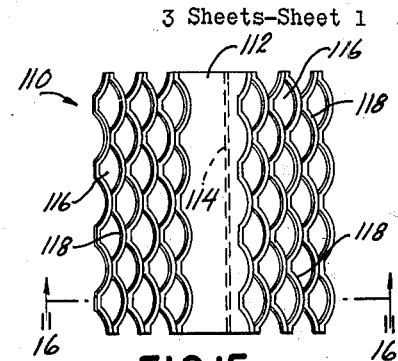
FIG.15
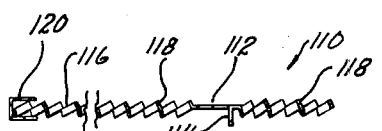
FIG.16
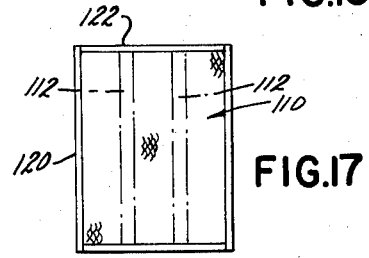
FIG.17
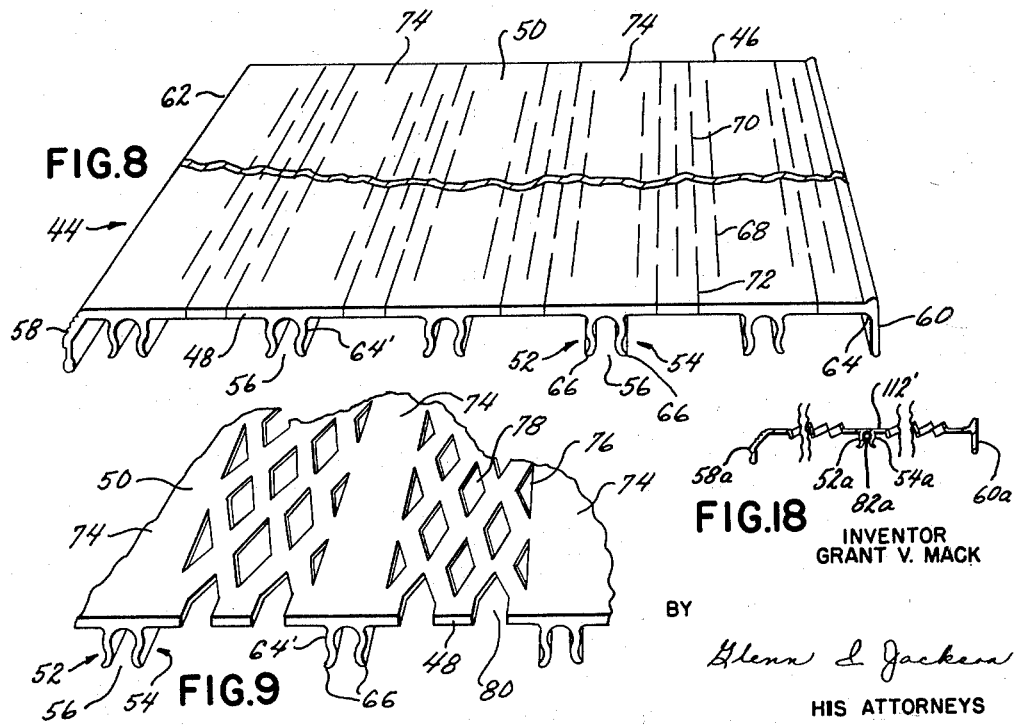
FIG.8
FIG.9
FIG.18
INVENTOR
GRANT V. MACK
BY
Glenn & Jackson
HIS ATTORNEYS Aug. 11, 1964  G. V. MACK  3,144,079
SHELF STRUCTURE INCLUDING A CONDUIT
Filed March 23, 1960  3 Sheets-Sheet 2

INVENTOR
GRANT V. MACK
BY
Glenn I Jackson
HIS ATTORNEYS

Aug. 11, 1964 G. V. MACK 3,144,079
SHELF STRUCTURE INCLUDING A CONDUIT
Filed March 23, 1960 3 Sheets-Sheet 3
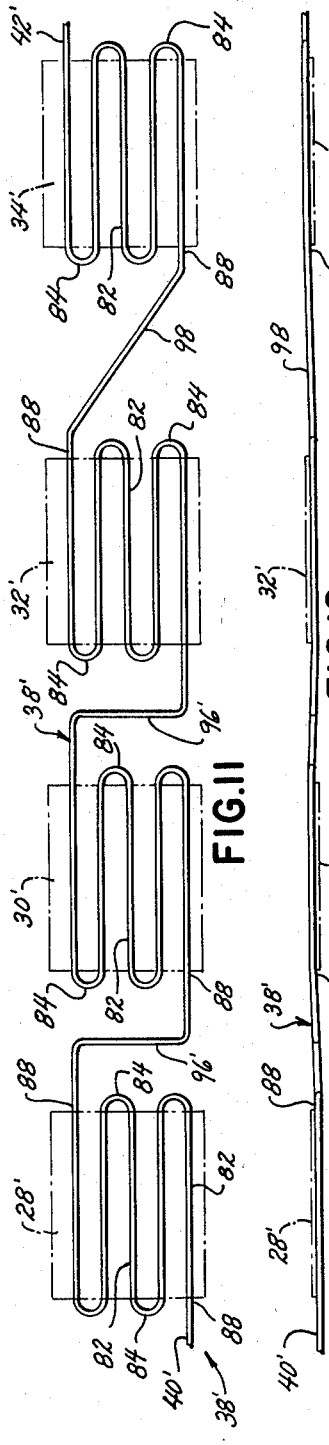
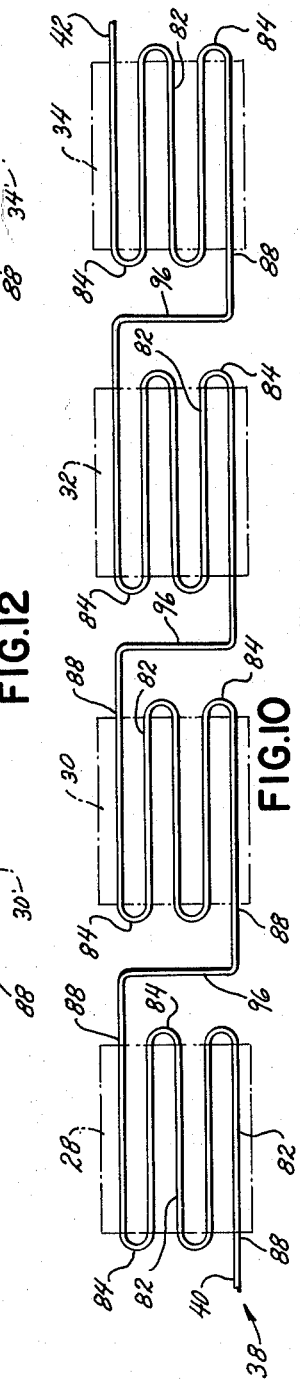
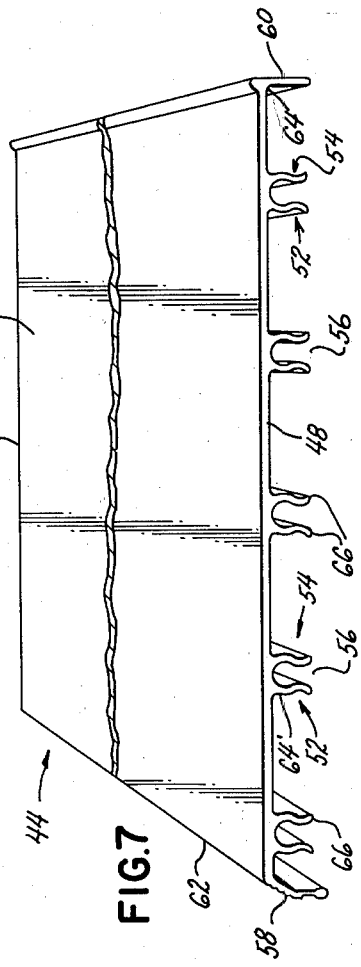
INVENTOR
GRANT V. MACK
BY
HIS ATTORNEYS United States Patent Office 3,144,079
Patented Aug. 11, 1964

3,144,079
SHELF STRUCTURE INCLUDING A CONDUIT
Grant V. Mack, Valley Station, Ky., assignor to Reynolds Metals Company, Richmond, Va., a corporation of Delaware
Filed Mar. 23, 1960, Ser. No. 17,116
13 Claims. (Cl. 165—67)

This invention relates to a shelf structure which is particularly applicable for use in connection with an enclosure or space which is to be cooled or heated by thermal fluid conducting tubing which may be associated in the shelf construction.

The shelves are inter-related with the tubing construction, so that manufatcure in large quantities may be performed at relatively low cost. The structure also lends itself to manufacture at specialized factories where the components are made, and from which they may be shipped to shelf manufacturing establishments where the shelves are assembled with the tubing and may also be applied to the enclosure or space where the completed shelf structure is to be mounted.

For example, long sheets of extruded and/or rolled material may be produced with ribs which are particularly adaptable to such linear production as extrusion or rolling. Such sheet construction may then be cut to desired dimensions transversely to the length of the long sheet and such cut sheets may then be expanded to provide ribs for securing the tubing to the shelves, reinforcing the shelves, and/or to provide edge ribs for reinforcing the edges of the shelves.

The tubing may be produced at a tubing manufacturing establishment where the tubing may be flushed, dehydrated, and cut to desired lengths of tubes which then have their ends sealed to maintain them in flushed and dehydrated condition until they are used at the shelf establishment.

The construction is such that heat exchange shelves of various dimensions and various spacings may be produced and are adapted for use in a large number of various enclosures and spaces.

Hence it is an object of this invention to provide a shelf structure embodying one or more of the features herein disclosed.

Other objects of this invention are apparent from this description and the accompanying drawings, in which:

FIGURE 1 is a view in perspective of a freezer embodying this invention.

FIGURE 7 is a view in perspective, on further enlarged scale, of a sheet such as used in FIGURES 4–6, and at an early stage of manufacture.

FIGURE 8 is a view similar to FIGURE 7, and showing the sheet at a later stage of manufatcure.

FIGURE 9 is a view of a portion of FIGURE 8 at a further stage of manufacture.

FIGURE 10 is a diagrammatic plan view showing a step in manufacture which may be used in producing the embodiment of FIGURE 2.

FIGURE 11 is a view similar to FIGURE 10, and showing a similar step for producing the embodiment of FIGURE 3.

FIGURE 12 is a diagrammatic elevation of FIGURE 11.

FIGURE 15 is a diagrammatic plan view of another embodiment of a sheet made according to this invention.

FIGURE 16 is a cross-section along the line 16—16 with an edge portion of the sheet added in broken away relationship.

FIGURE 17 is a plan view, on reduced scale, showing a shelf which may be produced from the embodiment shown in FIGURES 15 and 16.

FIGURE 18 is a cross-section, with parts broken away, of another embodiment using an expansion pattern similar to that of FIGURES 15 and 16.

Figure 2:
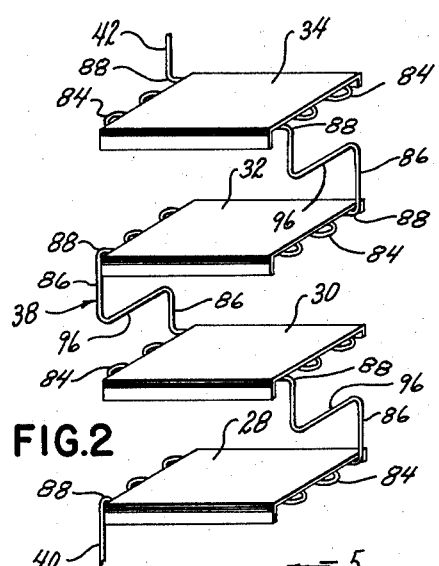
FIGURE 2 is a view in perspective diagrammatically indicating the relative positions of parts of this invention without any surrounding enclosure.

FIGURE 1 shows an enclosure to which this invention has been applied. The specific enclosure illustrated in FIGURE 1 is a refrigerated enclosure of the type generally referred to as a vertical freezer. However, this illustration is also emblematic of any other enclosure to which this invention may be applied, such as a horizontal freezer, an oven space, and any other enclosure or space in which a shelf structure according to this invention may be applied.

FIGURE 1 shows a refrigerated cabinet 20 having walls 22 and a swinging door 24. In closed position, the walls 22 and door 24 surround the enclosure 26 in which a shelf structure according to this inventoin may be supported.

A plurality of shelves, such as 28, 30, 32 and 34 are spaced apart, vertically in this instance, in the space 26 and are supported on supports 36 of suitable or well known construction and which are connected to and extend inwardly from the walls 22 of the enclosure a sufficient distance to support the shelf structure of this invention.

FIGURE 2 shows the shelves 28, 30, 32 and 34 without the enclosing structure of the cabinet 20. FIGURE 2 may also be considered as showing a stage of manufacture just prior to the insertion of the shelf structure into the enclosure 26 of the refrigerator shown in FIGURE 1.

Figure 3:
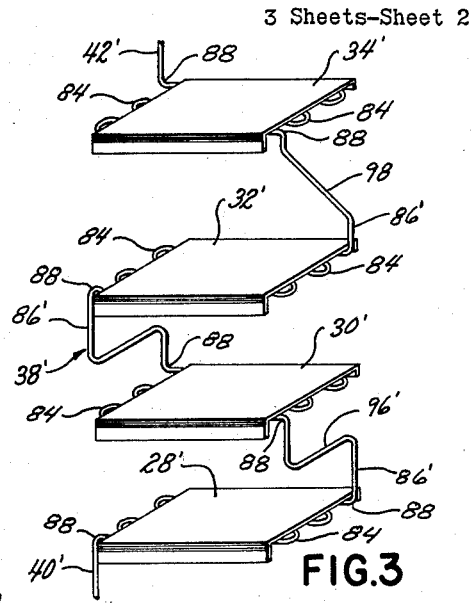
FIGURE 3 is a view similar to FIGURE 2, and showing the shelves spaced at varying distances.

FIGURE 3 shows a construction similar to FIGURE 2, in which the shelf 34' is spaced a different distance from the shelf 32' as compared to distances between the shelves 32', 30' and 28'. FIGURE 3 is illustrative of any spacing of the shelves in which one or more of the spaces between the shelves are different from others. On the other hand, FIGURE 2 illustrates an embodiment in which the shelves are substantially equally spaced.

FIGURES 1, 2, and 3 are intended to show only the relative positions of the shelves and are not intended to illustrate individual details of the shelves, which are more fully disclosed in connection with other figures. FIGURES 1, 2 and 3 are emblematic of any spacing arrangement for the shelves of this invention, which may be desired, and which may be both vertical and lateral.

A thermal fluid conducting tube 38, in FIGURES 1 and 2, and 38' in FIGURE 3, may be a unitary or homogeneous tube without any joints. Such tube, if desired, may have been flushed and dehydrated at the place of the tube manufacture, and may also have been sealed at the ends 40 and 42 at such place of tube manufacture. However, if desired, the flushing and dehydrating operation may be performed at the place of installation. While the ends 40 and 42 of FIGURES 1 and 2, and ends 40' and 42' of FIGURE 3 have been shown as closely adjacent to the shelves 28, 34, 28' and 34', respectively and merely by way of example, it is to be understood that the tube may extend completely to the refrigerating or heating unit without any intermediate joint, if desired.

Shelves used according to this invention, such as the shelves 28, 30, 32, 34, 28', 32', and 34', or any other shelves used according to this invention, may have some or all of the details disclosed in the shelves shown in other views herein shown or described.

For example, any of these shelves may have the construction, and may be manufactured by the method disclosed in connection with FIGURES 4 to 9 inclusive. A sheet 44 for a shelf, in a preliminary stage of manufacture, is shown in FIGURE 7. The sheet 44, FIGURE 7, which may be used to produce shelves herein disclosed, may be formed by extrusion in the form shown in FIGURE 7, or substantially as shown, by rolling processes, or by a combination of rolling and extrusion processes. For example, such a sheet 44 may be cut from a long extrusion of the same cross-section as shown in FIGURE 7, such cutting taking place at the edges 46 and 48, FIGURE 7. The extrusion may be a flat sheet or body 50 having one or more linear intermediate ribs 52 and 54 which, if desired, form one or more pairs of ribs 56. The ribs 52 and 54 are homogeneous with the sheet 50 and are parallel and closely adjacent to each other to form the pairs 56. The ribs 52 and 54, and the pairs 56, preferably are all parallel to each other to permit an economical forming process, such as in an extrusion process. In addition, if desired, the sheet 50 may also have one or more edge ribs 58 and 60 which are also homogeneous with the sheet 50 and extend along the edges 62 and 64 of the sheet 50. All of the ribs 52, 54, 58 and 60 may have their widths extending transversely, that is downwardly or upwardly in FIGURE 7, with respect to the sheet 50. For example, the ribs 52, 54, and 58 may extend only downwardly from the sheet 50 and the rib 60 may extend both upwardly and downwardly if desired.

Terms indicating relative directions, and the like, such as "upwardly," "downwardly," etc., are used for the sake of brevity and it is to be understood that they are not used by way of limitation, since the articles being described may actually extend in other directions, either temporarily or permanently.

The ribs 52 and 54 form pairs of ribs 56 for the reception of portions or runs of a tube, such as the tube 38 or 38' elsewhere described. The rib 58 may be a front rib to extend across the front of the shelf while the rib 60 may be the rear rib of the shelf. The rib 58 and/or 60 may be ornamental, if desired. The rib 58 preferably extends far enough down normally to hide the ribs 52 and 54 and the tube from view.

The ribs 52 and 54 may have upper curved portions 64' which are so curved to receive the tube constructions to be described. These ribs 52 and 54 may also have outwardly turned lips 66, which lips 66 are adapted to spread automatically apart when the tube 38 or 38' is forced into the space between the ribs 52 and 54. After the tube has been inserted, the lips 66 may be pinched together by any suitable means to retain the tube in place. Such means for forcing the lips 66 together may be, for example, a press-like tool with flat pinching bars or the like, a rubber hammer, or any tool, regular or special, suited to form the clamping operation. All of the ribs 52, 54, 58 and 60 have the additional function of reinforcing the sheet 50 against sagging under the weight of articles placed on the shelf, and these ribs are particularly effective when the edges 46 and 48 of the shelf are to be supported, such as those resting on or near the supports 36 of FIGURE 1.

FIGURE 8 shows the structure 44, or sheet 50, of FIGURE 7 after a plurality of discontinuous slits 68 and 70 and 72 have been formed therein. These slits may be produced at any stage of manufacture such as either during the manufacture of the sheet 50 of FIGURE 7, or thereafter. These slits may be very narrow, as diagrammatically indicated in FIGURE 8, or they may have a perceptible width, as desired, and as produced by the particular slitting process employed. Preferably there are no slits produced immediately above any of the ribs 52, 54, 58 and 60, where a plurality of unperforated or unexpanded bands 74 are formed. This maintains the ribs 52 and 54 which form a pair 56 properly spaced.

Either during the formation, or after the formation, of the slits 68, 70 and 72 of FIGURE 8, any desired expanding procedure may be used to produce a lateral opening of the slits 68, 70, and 72 to produce respectively the openings 76, 78 and 80 of FIGURE 9. The bands 74 are unexpanded during this process. Such expansion may be produced by a lateral pull along the edges of the sheet 50 or by the introduction of pronged tools as desired.

Figure 4:
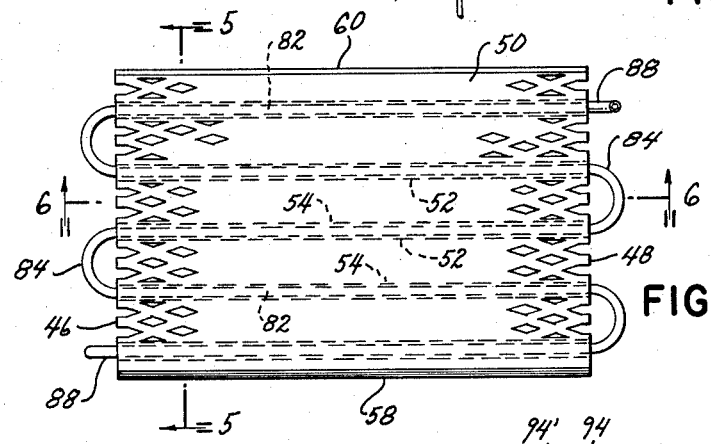
FIGURE 4 is a plan view, on enlarged scale, of a shelf structure which may be used, for example, in the embodiments of FIGURES 1, 2 and 3.
Figure 5:
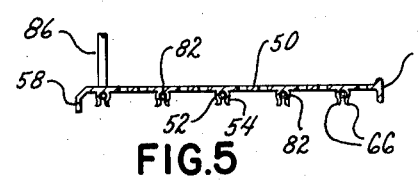
FIGURE 5 is a cross-section along 5—5 of FIGURE 4.
Figure 6:
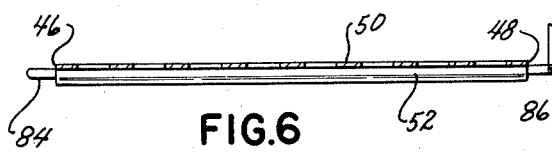
FIGURE 6 is a cross-section along the line 6—6 of FIGURE 4.

The tube 38 of FIGURES 1 and 2, for example, may be bent into a plurality of straight parallel runs 82, FIGURES 4, 5 and 6, which runs 82 are forced between the ribs 52 and 54 heretofore described. After these runs 82 have been forced into the spaces between the ribs 52 and 54, FIGURE 5, the lips 66 may be pinched together, either completely locked throughout the length of the lips, or at one or more intervals, sufficient to retain the runs 82 in a firmly secured condition with respect to the shelf or sheet 50. The runs 82 are serially joined together by the bends 84 at the ends of the sheet 50. The outer or front and back edge runs 82, adjacent the ribs 58 and 60, are connected either to the tube ends 40 and 42 or to the shelf connecting runs 86. These runs 82 are connected to the runs 86 by bends 88, which bends 88 may alternatively be connected to the tube ends 40 and 42.

If the tubing is formed of aluminum or aluminum alloy and is formed by the vacuum extrusion method, such tubing can withstand bending and twisting stresses, so that the bends 84 and 88 may be relatively sharp without harming the tube.

If the bends 84 are strong enough, the shelf or sheet 50, may be supported on the bends 84, which in turn can be supported by wall supports such as supports 36 shown in FIGURE 1. On the other hand, the wall supports 36 may extend sufficiently inward toward the center of the enclosure 26, so that the ends of the ribs 52 and 54 may rest on the supports 36, in which case the ribs 52 and 54 constitute beams which support the shelf construction on the supports 36. If the ribs 52 and 54 do not rest on the supports 36, then the ribs 52 and 54, as well as the ribs 58 and 60, form indirect beam constructions which indirectly derive their supports from the supports 36 through the medium of the bends 36.

Figures 13, 14:
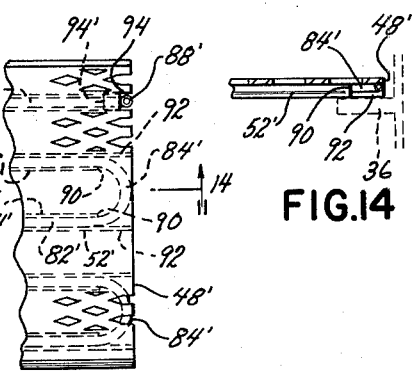
FIGURE 13 is a plan view of a portion of an embodiment somewhat similar to that of FIGURE 4.
FIGURE 14 is a cross-section along the line 14—14 of FIGURE 13.

FIGURES 13 and 14 show a shelf construction somewhat similar to that disclosed in connection with FIGURES 4 to 9, and may be manufactured substantially by the same processes, except that the construction is made so the bends 84' and 88' do not extend beyond the edge 48' and the opposite edge, not shown, which correspond respectively to 48 and 46 of FIGURE 4. This is accomplished by cutting away the end portions of ribs 52' and 54', in FIGURES 13 and 14, as indicated at 90, to permit the bends 84' to curve under the shelf and between the runs 82' as indicated at 84' in FIGURE 13. The uncut ends 92 of the ribs 52' or 54', as the case may be, may rest directly on a shelf 36, of FIGURE 14, which permits such ribs to become direct beams between opposite supports 36. If the supports 36 are wide enough, even the cut ends 90 may also rest on the shelf 36, as indicated in FIGURE 14. Notches 94, or deeper notches 94', as may be required, may be cut where the outer runs 82' are formed into upward bends 88', FIGURE 13. The depth of the slot 94, or 94', depends upon the bending properties of the tube being used in the shelf construction.

The shelf connecting runs 86, FIGURE 2, may be made longer than necessary to connect the various shelves, in order to make them adaptable for various space distances. These tube connectors 86 may be bent as indicated at 96 in FIGURE 2 in substantially identical manner in order to provide the equal spaces shown in FIG- URE 2. However, if one or more of the shelves, such as shelf 34', of FIGURE 3, is to be spaced a different distance from the spacing of other shelves 28', 30' and 32', for example, then that particular shelf tube connector 86' may be slantingly bent, as indicated at 98, FIGURE 3, whereas the other connectors 86' between the equally spaced shelves 28', 30', and 32' may be bent at 96' substantially the same as in FIGURE 2 if the spacing of these three lower shelves is substantially equal and identical with the equal spacing shown in FIGURE 2. Thus by making the shelf connecting tube runs 86 and 86' longer than necessary, a construction is provided where the shelves may be spaced at various distances as required. This is particularly useful where standard lengths of precut tubes are used with sealed ends when the tubing has been flushed and dehydrated by the tube manufacturer. However, if the tubing is to be cut, flushed and dehydrated by the shelf installer or manufacturer, then the shelf connecting runs 86 may be made as short as possible, if desired.

The shelves and tube may be assembled together in any desired manner. For example, in FIGURE 2, the shelves 28, 30, 32 and 34 may be held in properly spaced position as shown in FIGURE 2, and then the tubing may be bent substantially to the shape shown in FIGURE 2, and may be inserted under the shelves and into the spaces between the ribs 52 and 54 and there secured in place. Alternatively, the tubing may be held substantially in the position shown in FIGURE 2, and then the shelves 28, 30, 32, and 34, may be placed over the tubing and the runs 82, not shown in FIGURE 2, and may then be secured to the ribs 52 and 54 heretofore described. On the other hand, the parts shown in FIGURE 2 may be turned upside down. That is, the shelves 28, 30, 32 and 34 may be supported on jigs with the flat surface down and with the ribs 52 and 54 directed upwardly. Then the runs 82 of tubing 38 may be applied between the ribs 52 and 54 (shown in FIGURE 4, etc.) in a downward direction and may be pinched in place. Alternatively, with the parts shown in FIGURE 2 upside down, the tubing 38 may be supported on the jig, and the shelves 28 and 30, 32 and 34 may be applied upwardly with the ribs 52 and 54 (shown elsewhere) directed upwardly and may then be pinched in place. The foregoing operations may be equally applicable to FIGURE 3 in which case all operations would be the same, except that one or more of the connectors 86' may be specially bent as at 98 to provide a special or different spacing between any of the shelves desired. The other specific procedures heretofore disclosed with respect to FIGURE 2 are not repeated in connection with FIGURE 3, since the analogy is obvious.

The tubing and shelves may be assembled in any other desired manner. For example, FIGURES 11 and 12 show how the tubing and shelves may be assembled in horizontal position and may then be bent in zig-zag fashion into the shape shown in FIGURE 3. To accomplish this, the tubing 38' may be laid in horizontal position and may be bent to form the runs 82 and the bends 84 while the tubing remains substantially in horizontal position. Then the shelves 28', 30', 32', and 34' may then be applied to the tubing. The shelves 28' and 32' are applied above the tubing 38' in FIGURE 12, and with the ribs 52 and 54 in downward direction. The shelves 30' and 34' are applied under the tubing with the ribs 52 and 54 in upward direction. After the tubing and shelves are secured together by pinching the ribs 52 and 54 while still in horizontal position, then the tubing may be bent to form the bends 88 in a zig-zag manner while swinging the shelves into vertical relationship of the character shown in FIGURE 3. That is, for example, the shelf 28' is maintained in horizontal position, and the other three shelves 30', 32', and 34' may be swung upwardly. Thereafter the shelves 30, 32, and 34 are swung serially in a zig-zag manner upwardly until the shape of FIGURE 3 is reached.

FIGURE 10 shows a plan view corresponding to the plan view of FIGURE 11, but to produce the arrangement of FIGURE 2. The same procedure is followed with respect to the arrangement of FIGURE 10 as has been described in connection with FIGURES 11 and 12, except that a bend 96 is produced between the shelves 32 and 34 of FIGURE 10 equal to the bends 96 of FIGURE 10 instead of the slanting bend 98 shown in FIGURE 11. The shelves and tubing of FIGURE 10 are designated by some of the reference characters heretofore used from which the analogy to FIGURES 11 and 12 is obvious. It is therefore deemed unnecessary to repeat a detailed description of the procedure of FIGURE 10.

FIGURES 15, 16, and 17 show another embodiment of shelf construction which may also include, if desired, the tube holding embodiment of FIGURE 18. A flat sheet 110 may be extruded and/or rolled in such a manner that it may be expanded to produce an unexpanded flat band 112, or a plurality of such flat bands 112, with a homogeneous transverse rib 114, or a plurality of such ribs 114, on such bands or on each band. The sheet 110 may have openings 116 produced on one or both sides of the flat band 112, or flat bands 112 as the case may be, in such a manner that the expanded openings 116 have walls 118 which slant transversely to the plane of flat band 112, as indicated in FIGURE 16. Such openings 116 may be formed by one or more pronged piercing members, of well known construction, which pierce the sheet and then move sidewise or cause a sidewise movement to produce the slanting walls 118. FIGURE 17 shows a shelf produced from the sheet 110 of FIGURES 15 and 16 to which the channel members 120 and 122 may be secured along the edges of the sheet 110, for example with heat sealable adhesive film ribbons cut from heat bonding such as film AF102 manufactured and sold by the Minnesota Mining and Manufacturing Company, or by a fluid bonding material such as epoxy resin adhesive, applied in the usual manner. The cross-section of 120 and 122 is shown at 120 in FIGURE 16. The flat bands 112 are indicated by dotted lines and by the reference numerals 112 in FIGURE 17.

FIGURE 18 shows how the flat band 112', which corresponds to the flat band 112 of FIGURE 16, may be provided with prongs 52a and 54a similar to the prongs 52 and 54 heretofore described in connection with the previous figures. These prongs 52a and 54a may receive and secure runs 82a similar to runs 82 heretofore described which may be secured in substantially the same manner. FIGURE 18 also shows a downward front rib 58a and a rear rib 60a similar to ribs 58 and 60 heretofore described. The shelf of FIGURES 15 and 16 may be provided with tube holding ribs similar to 52a and 54a and front and rear ribs similar to 58a and 60a of FIGURE 18 in lieu of the channel members 120 of FIGURE 17 if desired.

The shelf of FIGURES 15 and 16 may be an unrefrigerated or unheated shelf, whereas the shelf of FIGURE 18 may be refrigerated or heated shelf and vice versa, as is obvious.

All of the shelves which have been disclosed with tube holding ribs, such as in FIGURES 4, 13 and 18, may be used without any tube in them as unrefrigerated or unheated shelves. They may be used as additional shelves in the same enclosure or space with heated or refrigerated shelves, or they may be used in an enclosure or space which does not contain such heated or refrigerated shelves, as desired.

Shelves made according to this invention may be made of aluminum, suitable aluminum alloys, and similar metallic and/or extrudable substances. The shelves may be finished as desired, such as by anodizing, coloring steps, and similar steps to make the shelves attractive and durable. The shelves may be heat and work treated at any stage of manufacture to produce the desired temper in the finished shelves.

A new, useful, and efficient shelf structure has been thus provided.

While the form of the invention now preferred has been disclosed as required by statute, other forms may be used all coming within the scope of the claimed subject matter which follows.

What is claimed is:

1. In combination: an enclosing structure having opposed vertical walls respectively carrying inwardly directed and aligned supports; a flat sheet having linear rib means homogeneous with said sheet and having width means extending transversely to said sheet; and a heat exchanger tube secured to said sheet by said rib means, said rib means having a depth greater than the depth of said heat exchanger tube, said sheet having only said rib means resting on said supports to cause said sheet to provide a shelf in said enclosing structure with said rib means acting as a beam between said supports to reinforce said shelf from sagging.

2. In combination: an enclosing structure having opposed vertical walls respectively carrying inwardly directed and aligned supports; a flat sheet having a pair of linear ribs homogeneous with said sheet and parallel and closely adjacent to each other, said ribs having a width extending transversely to said sheet, said sheet having a plurality of openings in said sheet; and a heat exchange tube held between said pair of linear ribs, said sheet having one of said tube and said ribs resting on said supports to cause said sheet to provide a shelf in said enclosing structure with said ribs acting as beams between said supports to reinforce said shelf from sagging.

3. A combination according to claim 2 in which a plurality of parallel pairs of linear ribs are provided which are similar to said first named pair of ribs, and in which said heat exchange tube is held between said parallel pairs of linear ribs.

4. A combination according to claim 2 in which an edge rib homogeneous with said sheet and having a width extending transversely to said sheet is provided along one edge of said sheet.

5. A combination according to claim 2 in which a plurality of edge ribs homogeneous with said sheet and having a width extending transversely to said sheet are provided along a plurality of edges of said sheet.

6. In combination: an enclosing structure having opposed vertical walls respectively carrying inwardly directed and aligned pairs of supports; a plurality of spaced, flat sheets, each respective sheet having linear rib means homogeneous with each respective sheet and having width extending transversely to said respective sheet; and a homogeneous, heat exchange tube secured to said sheets by said rib means, each said sheet having one of said tube and said rib means resting on one pair of said opposed supports to cause said respective sheet to provide a shelf in said enclosing structure with said rib means acting as beam means between said pair of supports to reinforce said respective shelf from sagging.

7. A combination according to claim 6 in which said sheets are vertically spaced.

8. A combination according to claim 6 in which said sheets are spaced equal distances apart.

9. A combination according to claim 6 in which said sheets are spaced different distances apart.

10. In combination: an enclosing structure having opposed vertical walls respectively carrying inwardly directed and aligned pairs of opposed supports; a plurality of spaced, flat sheets, each respective sheet having a pair of linear ribs homogeneous with each respective sheet and parallel and closely adjacent to each other, said ribs having a width extending transversely to each respective sheet, each respective sheet having a plurality of openings formed in said sheet; and a homogeneous heat exchange tube held between said pairs of linear ribs, each said sheet having one of said tube and said ribs resting on one pair of opposed supports to cause said sheet to provide a shelf in said enclosing structure with said ribs acting as beams between said supports to reinforce said shelf from sagging.

11. A combination according to claim 10 in which said sheets are vertically spaced.

12. A combination according to claim 10 in which said sheets are spaced equal distances apart.

13. A combination according to claim 10 in which said sheets are spaced different distances apart.

References Cited in the file of this patent

UNITED STATES PATENTS

| | | |
|---|---|---|
| 2,190,288 | Higham | Feb. 13, 1940 |
| 2,268,885 | McCullough | Jan. 6, 1942 |
| 2,320,502 | Schullstrom | June 1, 1943 |
| 2,687,626 | Bartlowe | Aug. 31, 1954 |
| 2,722,732 | Sandberg | Nov. 8, 1955 |
| 2,732,615 | Sandberg | Jan. 31, 1956 |
| 2,795,035 | Kafer | June 11, 1957 |
| 2,830,799 | Amerio | Apr. 15, 1958 |
| 2,856,163 | Bidak et al. | Oct. 14, 1958 |
| 2,920,380 | Williams et al. | Jan. 12, 1960 |
| 2,932,491 | Miller | Apr. 12, 1960 |